May 6, 1952  P. ALTMAN  2,595,558
POWER PLANT
Filed Oct. 7, 1948
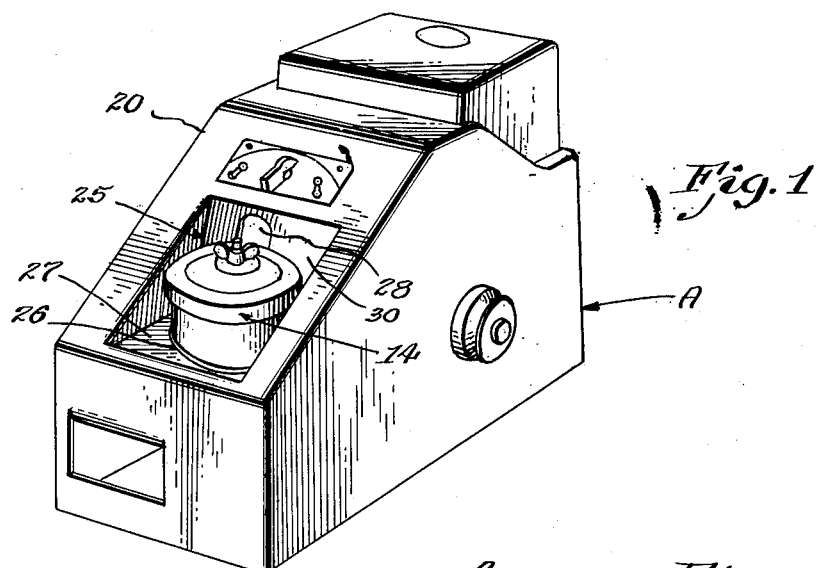
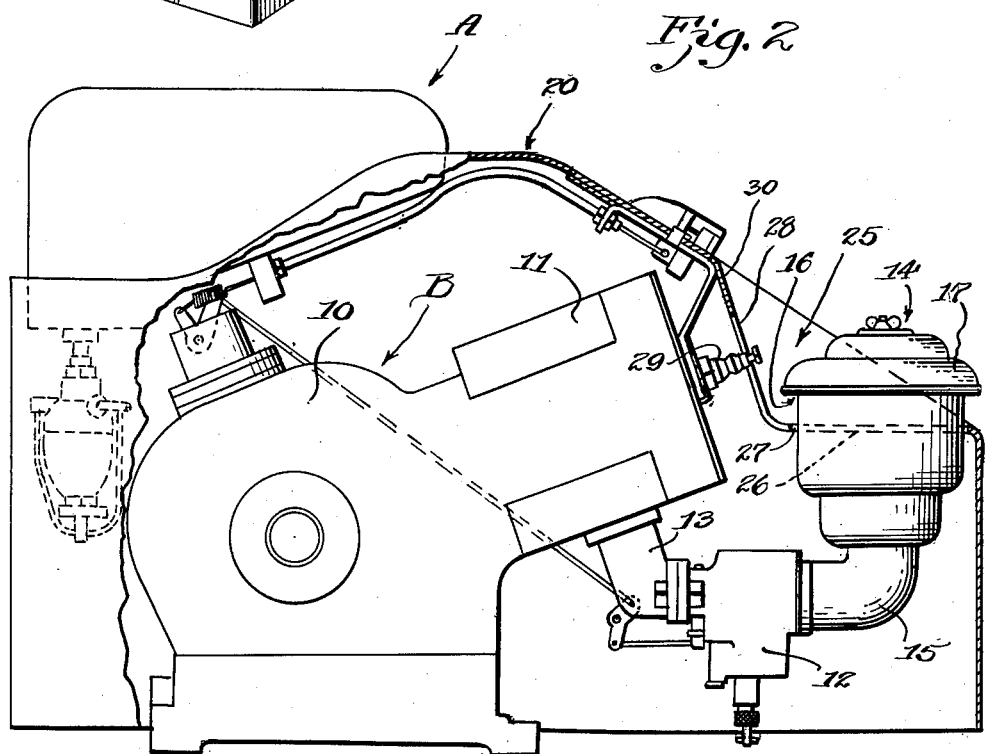
INVENTOR.
Peter Altman
BY
Hauke & Hardesty
Attorneys.

Patented May 6, 1952

2,595,558

UNITED STATES PATENT OFFICE 2,595,558

POWER PLANT

Peter Altman, Detroit, Mich., assignor to Continental Motors Corporation, Detroit, Mich., a corporation of Virginia Application October 7, 1948, Serial No. 53,259

4 Claims. (Cl. 123—198)

My invention relates to power plants and more particularly to one of the portable type in which an internal combustion engine is enclosed in a housing, and which embodies a particular arrangement accommodating certain of the engine accessories.

The enclosing of an internal combustion engine in a housing results in many difficulties of construction not readily apparent to one though skilled in the art. The various engine accessories require adjustment and an adequate air supply for engine cooling and for the carburetor is required. It is difficult to provide an adequate supply of air for the carburetor from the cooling air system, particularly since in engine structure suitable for assembly in a power plant where overall height is to be maintained at a minimum by positioning the engine on its side, the carburetor is disposed in a zone outside of the direct air flow used to cool the engine cylinder. Then to obtain efficient engine performance it is preferable to draw in cool air to obtain the best possible volumetric efficiency. The many problems make it difficult to organize an assembly such as developed by applicant without sacrificing engine efficiency.

It is an object of my present invention to overcome these difficulties without sacrificing overall efficiency by constructing an engine assembly which provides a unit power plant embodying a housing, a casing enclosing the entire engine, and cooperating accessories, and this objective is accomplished by constructing an engine housing designed to facilitate engine performance, particularly with respect to the arrangement supplying an adequate amount of clean air to the carburetor.

Other objects of my invention will be more apparent as the description progresses, wherein the advantages of the preferred embodiment of my invention are pointed out.

For a more detailed understanding of my invention, reference may be had to the accompanying drawing and description wherein like parts are referred to by like characters throughout the several views, and in which Fig. 1 is a perspective view of the power plant constructed in accordance with my invention, and Fig. 2 is a side view thereof showing a portion of the engine housing in section to illustrate the invention.

The power plant A comprises an internal combustion engine B of conventional construction consisting of a crankcase 10, a cylinder 11 disposed at an angle to the vertical and preferably laying almost on its side as clearly shown in Fig. 2. This engine design is particularly applicable to an assembly in which the overall height is to be maintained at a minimum. The engine is provided with a carburetor 12 connected with the engine by a pipe 13 and to an air cleaner 14 by an elbow conduit 15. The air cleaner has an air intake 16 disposed around the cover 17.

A housing 20 encloses the entire engine and the accessories mounted on said engine. This housing comprises an elongated casing structure overlying and enclosing the engine crankcase and cylinder, and the top wall of said housing is sloped generally downwardly over the cylinder and generally encompasses the air cleaner 14, said housing having an extended portion of sufficient length to enclose the carburetor and the principal portion of the air cleaner.

This housing is provided with a depressed portion forming a pocket 25 adjacent the end thereof remote from the engine crankcase, and comprises a depressed wall portion 26 provided with an opening 27 through which the air cleaner is partially extended in order to locate the air inlet opening of said air cleaner externally of the housing and locating principal part of the air cleaner internally of the housing and within the pocket 25. The opening 27 has an extended opening portion 28 overlying the cylinder head of the engine through which access may be had to the spark plug 29, said plug slightly projecting through this opening 28. The back wall 30 of the pocket preferably closely overlies the engine cylinder head and extends substantially parallel to the top face of the cylinder head.

It will be noted that the carburetor is suspended beneath the engine cylinder and extends beyond the cylinder head, and the air cleaner 14 is still further remote from the engine crankcase.

While I have illustrated and described but one application of my invention, it will be apparent to those skilled in the art to which my invention pertains, that various modifications and changes may be made without departing from the spirit of my invention or from the scope of the appended claims.

I claim:

1. A housing for a portable internal combustion engine having a crankcase, an engine cylinder disposed generally inclined with respect to the engine vertical plane containing the crankshaft axis and other accessories carried by the engine, such as a carburetor and air cleaner, said air cleaner being located generally beyond the extreme limits of the engine cylinder, said housing comprising a casing having top, side and end walls, one end portion of the casing comprising an extended portion enclosing said engine cylinder and a portion of the air cleaner assembly, said extended end portion of said housing provided with an opening in the top wall portion through which said air cleaner projects.

2. A housing for a portable internal combustion engine having a crankcase, an engine cylinder disposed generally inclined with respect to the engine vertical plane containing the crankshaft axis and other accessories carried by the engine, such as a carburetor and air cleaner, said air cleaner being located generally beyond the extreme limits of the engine cylinder, said housing comprising a casing having top, side and end walls, one end portion of the casing comprising an extended portion enclosing said engine cylinder and a portion of the air cleaner assembly, said extended end portion having a downwardly inclined top wall provided with an inwardly depressed pocket having an opening in the bottom of the pocket and through which said air cleaner is adapted to partially project.

3. A housing for a portable internal combustion engine having a crankcase, an engine cylinder disposed generally inclined with respect to the engine vertical plane containing the crankshaft axis and other accessories carried by the engine, such as a carburetor and air cleaner, said air cleaner being located generally beyond the extreme limits of the engine cylinder, said housing comprising a casing having top, side and end walls, one end portion of the casing comprising an extended portion enclosing said engine cylinder and a portion of the air cleaner assembly, said extended end portion having a downwardly inclined top wall provided with an inwardly depressed pocket having an opening in the bottom of the pocket and through which said air cleaner is adapted to partially project, said opening having a relatively narrower extension extending part way up an end wall of said pocket and so dimensioned as to permit access to be had to a spark plug carried on the engine cylinder head, said spark plug adapted to partially project through the narrower opening extension.

4. A housing for a portable internal combustion engine having a crankcase, an engine cylinder disposed generally inclined with respect to the engine vertical plane containing the crankshaft axis and other accessories carried by the engine, such as a carburetor and air cleaner, said air cleaner being located generally beyond the extreme limits of the engine cylinder, said housing comprising a casing having top, side and end walls, one end portion of the casing comprising an extended portion enclosing said engine cylinder and a portion of the air cleaner assembly, said extended end portion having a downwardly inclined opening in the bottom of the pocket and through which said air cleaner is adapted to partially project, said inwardly depressed pocket having one end wall disposed to overlie and to extend substantially parallel with respect to the outer top face of the engine cylinder head and the bottom wall extending generally horizontally just below the intake of said air cleaner.

PETER ALTMAN.

REFERENCES CITED

The following references are of record in the file of this patent:

UNITED STATES PATENTS

| Number | Name | Date |
|---|---|---|
| 1,474,467 | Ferguson | Nov. 20, 1923 |
| 1,947,713 | Gumpper | Feb. 20, 1934 |
| 2,123,358 | Grutzner | July 12, 1938 |
| 2,177,687 | Bracken et al. | Oct. 31, 1939 |
| 2,410,142 | Altman | Oct. 29, 1946 |
| 2,410,143 | Altman | Oct. 29, 1946 |